United States Patent [19]

Gadke-Fuhrmann

[11] Patent Number: 5,174,879
[45] Date of Patent: Dec. 29, 1992

[54] APPARATUS FOR SIMULTANEOUS DISINFECTION AND REMOVAL OF NITRATE/NITRITE IONS AND OTHER ADSORBABLE CHEMICALS FROM DRINKING WATER

[75] Inventor: Elke M. Gadke-Fuhrmann, Bad Homburg, Fed. Rep. of Germany

[73] Assignee: Medarex Aktiengesellschaft, Vaduz, Liechtenstein

[21] Appl. No.: 665,459

[22] Filed: Mar. 7, 1991

[30] Foreign Application Priority Data

Mar. 7, 1990 [DE] Fed. Rep. of Germany ....... 4007151

[51] Int. Cl.⁵ .............................................. C02F 9/00
[52] U.S. Cl. .................................. 204/265; 204/277; 210/202; 210/257.1; 210/259; 210/266; 210/284; 210/290
[58] Field of Search ................... 210/86, 97, 202, 203, 210/206, 257.1, 259, 266, 283, 284, 290, 668, 900; 204/265, 277

[56] References Cited

U.S. PATENT DOCUMENTS 3,870,033  3/1975  Faylor et al. ................... 210/900
3,915,857  10/1975  Olson ............................ 210/668

*Primary Examiner*—Ivars Cintins
*Attorney, Agent, or Firm*—Robert J. Koch

[57] ABSTRACT

A device for the continuous disinfection of and removal of nitrate/nitrite ions as well as other adsorbable organic impurities from water and a process for using the device are disclosed. Three or more containers may be arranged in series in the direction of water flow. A first container may contain a water reservoir with a level control. A second container may contain a gaseous disinfecting agent producing device, which may be a cartridge releasing hypochloric acid through a membrane. Alternatively, the gaseous disinfecting agent producing device may be a sodium chloride electrolytic cell having a diaphragm. A third container may include a plurality of acrylic filters and a nitrate-specific ion exchanger. A fourth container may include an activated charcoal filter.

13 Claims, 1 Drawing Sheet

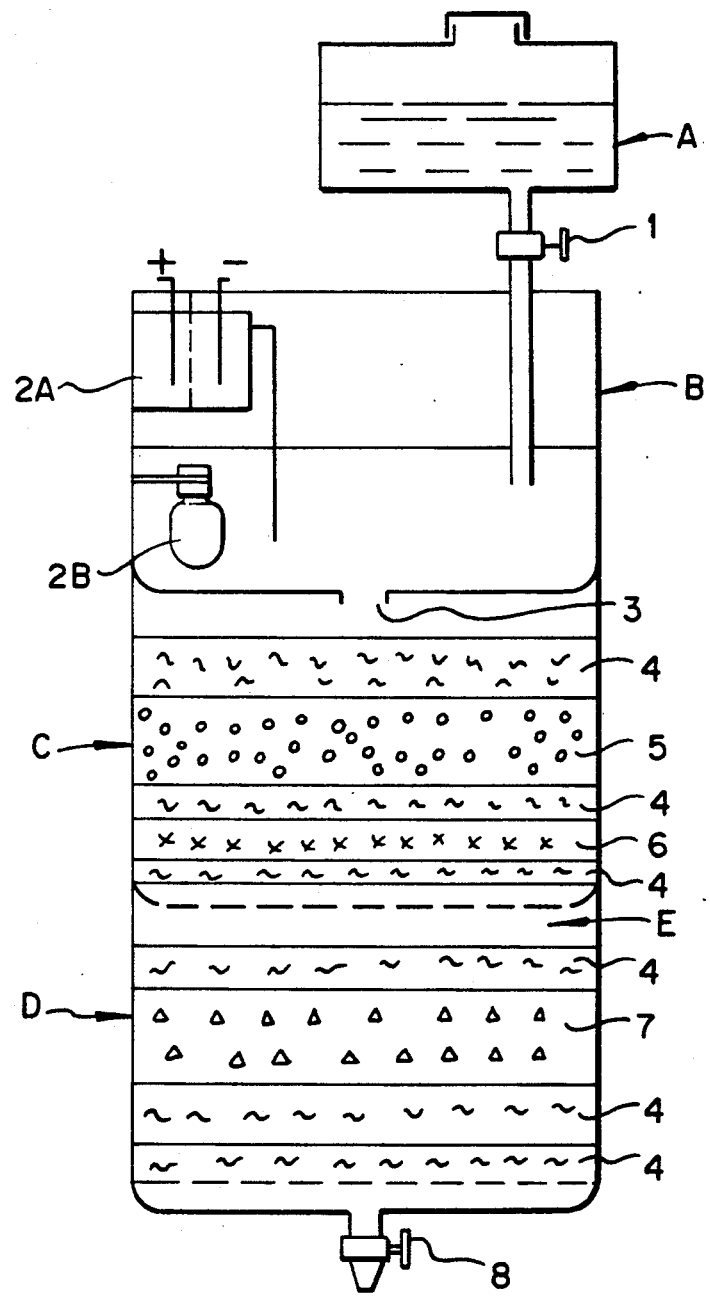

APPARATUS FOR SIMULTANEOUS DISINFECTION AND REMOVAL OF NITRATE/NITRITE IONS AND OTHER ADSORBABLE CHEMICALS FROM DRINKING WATER

BACKGROUND OF THE INVENTION

1. Field of the Invention

The present invention relates to a device suitable for the simultaneous disinfection and removal of nitrate/nitrite ions as well as other adsorbable organic impurities present in small quantities of drinking water. The present invention also relates to a process for the simultaneous disinfection and removal of nitrate/nitrite ions as well as other adsorbable organic impurities present in small quantities of drinking water.

2. Description of the Related Technology

Nitrates are, in addition to being found in ever-increasing amounts in drinking water, naturally present in food products, notably those of plant origin.

The toxicity of a nitrate rises considerably if reduced to a more harmful nitrite. This reduction can occur in a variety of ways, for example:

1) by the presence of nitrate-reducing bacteria in the gastro-intestinal tract, and
2) by the presence of nitrate-reducing micro-organisms in water-treatment systems, for example, those used domestically.

The increase of nitrate concentrations in drinking water, added to the presence of pesticides and insecticides that has been occasioned by the wasteful practices of the past, is today causing growth concern throughout the world. In addition to the problems posed by the presence of such toxic substances in water supplies is the continuing need to secure bacteria-free water supplies. Industrialized countries, furthermore, are experiencing a growing demand for the treatment of smaller supplies of drinking water, such as are used for example in preparing baby formulas, on travel or camping trips. In third-world countries, the treatment of smaller quantities of water is of great importance, since up to the present, the majority of cities and towns in those countries often procure their drinking water from unreliable sources of supply.

This fact increases the urgency of finding a means of treating limited quantities of drinking water which, in a cost-effective and simple manner, is capable of removing bacteria, nitrates or nitrites and, last but not least, harmful organic impurities. An ideal purification process would not involve adding chemical products to the already overloaded water. A review of the currently-available systems or methods employed to disinfect water or remove nitrate/nitrite ions has demonstrated, however, that there currently exists no practical system capable of addressing the above-mentioned concerns. Although there are presently a number of water-filtration systems on the market, these are nothing more than anion/cation exchanges, which, by removing all present anions and cations are able to produce pure, distilled water. Nutritional science teaches us however, that distilled water was never suited for the human palate, and could even pose a threat to health.

There also currently exist on the market numerous apparatuses for softening or simply filtering drinking water destined for household consumption. During operation of these systems however, the micro-organisms normally present in the supplied water collect and multiply inside the apparatus itself. If none of these filtration systems has there been any provision made for the removal of such accumulated micro-organisms after prolonged periods of use. This can reduce the effectiveness of such systems to the point of their becoming unuseful.

It is known that ion exchangers, due to their highly porous structure, constitute an ideal breeding side for bacteria.

It is further recognized that such prior art ion exchangers, which are preferably embodies in the form of small spheres, are, when loaded with nitrate ions, quite susceptible to becoming sites for bacterial growth.

The nitrate concentrations in drinking water are constantly on the increase throughout the world. In many cases, the reason for such high concentration lies in the intensive over-fertilization of agricultural soils. Any nitrogen that is not absorbed by either the soil or plants is washed away, enters the ground or surface water systems and then the food chain.

The admissible limit for nitrate concentration in drinking water has been set in European countries at 25 mg/l. Because many drinking-water sources have concentrations surpassing these limits, there exists in practically all of these countries a growing need for a safe and easy-to-operate filtration device for the treatment of water used for drinking purposes and for the preparation of food products that are free of harmful substances.

The removal of nitrate ions with the aid of ion exchanging systems is known in the art. One problem, however, is that of keeping the ion exchanger free of bacteria and maintaining such a system bacteria-free throughout repeated use cycles.

SUMMARY OF THE INVENTION

The object of the present invention is the creation of a filtration unit, which not only enables the removal of nitrate ions and other adsorbable substances from drinking water, but also permits continuous or periodical disinfection of the filtration layers without the further addition of chemical products.

The object of the present invention is addressed by means of a prior art device of the kind mentioned above, wherein one or more containers are connected together in series in the direction of water flow (A, B, C, D) to form a unit, whereby the first container (A) comprises a water reservoir having level control, to which is connected a device serving to continuously produce gaseous disinfecting agent (2A or 2B), which is directed, together with the water to be purified, into a container (C) that is provided with acryl filters and layers of nitrate-specific anion exchangers, to which, lastly, is connected a container (D) that comprises activated charcoal filters.

It is proposed that a gaseous disinfecting agent be added to the water to be disinfected.

Added to the water in one configuration of the present invention is hypochloric acid and an excess quantity of active chlorine, which is completely removed at the end of the last container before the water leaves the unit.

In an alternative embodiment of the present invention, container (C) contains a nitrate-specific ion exchanger, which comprises a group of anion exchangers for the purpose of removing nitrate/nitritic ions.

BRIEF DESCRIPTION OF THE DRAWINGS

The sole figure shows a water disinefecting and impurity removing device according to the invention.

DETAILED DESCRIPTION OF THE PREFERRED EMBODIMENT

The concept of the present invention is based on the need for simultaneous disinfection and removal from drinking water of nitrate/nitrite ions as well as other adsorbable substances. Although the methods presently being used for chlorination/denitrification and adsorption are known in the art, the proposed combination of such processes gives rise to remarkable results. The reason for the such positive results resides in the existence of free chlorine radicals at all stages of the proposed process. This arrangement thus precludes any bacterial contamination throughout the system and increases ion exchanger selectivity for nitrate ions as well as the flocculation of any matter suspended in the water. In addition, the adsorption characteristics of the active charcoal filters are enhanced. The attached drawing illustrates the structure of a proposed compact filtration unit.

A water reservoir A comprises a level-control 1, which directs the water to be disinfected into container B. In the configurations presently illustrated, continuous chlorination is employed. Configuration 2A comprises, in this arrangement, one electrolytic cell for sodium chloride, comprising a diaphragm.

Used in another alternative embodiment of the present invention, is a cartridge 2B that operates on the principle of diffusion through artificial membranes.

In one of the two alternative configurations, only hypochloric acid is added continuously to the water to be disinfected. The water, which has an excess of active chlorine, seeps through the outlet 3 of container B into container C, which is provided with a variety of filters. In the present arrangement, first filter layer 4 comprises an acrylic filter, while layers 5 and 6 comprise nitrate-specific anion exchangers, each of which is embedded between further acrylic filters 4. Lastly, the water stream enters container D that is fitted with special activated charcoal filters 7. From outlet 8 pours disinfected, pure water, which in addition to being free of chlorine, retains its original concentration levels for ions of essential elements.

The effectiveness of the compact unit is measured by the continuous presence of active chlorine in the system until shortly before the water outlet. The excess active chlorine is completely removed by the activated charcoal filter, which renders the water leaving the device odourless, free from bacteria, nitrates, nitrites and adsorbable organic impurities such as pesticides and herbicides, while retaining normal concentration levels of anions/cations of naturally-occurring elements.

The following table indicates the analytical results obtainable by using the proposed water purification unit.

| Ions Conc. mg/l | Before Filtration mg/l | After Filtration mg/l |
| --- | --- | --- |
| Nitrates | 45 | 1 |
| Chlorides | 28 | 38 |
| Sulfates | 39 | 29 |
| Bicarbonate | 96 | 100 |
| Calcium | 51 | 51 |
| Sodium | 16 | 16 |
| Potassium | 1.4 | 1.4 |
| Magnesium | 8.3 | 8.4 |
| Atrazine | 0.5 μg/l | 0 |
| Chloroform | 3 μg/l | 0 |

The size of the apparatus used permitted the preparation of 5 l/per day of pure water for two weeks.

The illustrated embodiments are shown by way of example. The spirit and scope of the invention are not to be restricted by the embodiments shown.

I claim:

1. A water disinfecting and impurity removing device including a plurality of containers connected in series int he direction of process flow to form a unit, said device comprising:
    a first water reservoir container;
    a level control connected to said first container;
    a second container, in fluid communication with said first container;
    a gaseous disinfecting agent producing device attached to said second container;
    a third container, in fluid communication with said second container;
    an acrylic filter located within said third container;
    a nitrate-specific ion exchanger located within said third container;
    a fourth container, in fluid communication with said third container, and
    an activated charcoal filter located within said fourth container.

2. A water disinfecting and impurity removing device in accordance with claim 1, wherein said gaseous disinfecting agent producing device is located inside said second container and is configured to provide continuous chlorination of said water.

3. A water disinfecting and impurity removing device in accordance with claim 1, wherein said gaseous disinfecting agent producing device is a cartridge configured to release hypochloric acid into water passing through said second container.

4. A water disinfecting and impurity removing device according to claim 3, wherein said cartridge comprises a membrane.

5. A water disinfecting and impurity removing device according to claim 4, wherein said membrane is made from an artificial material.

6. A water disinfecting and impurity removing device in accordance with claim 1, further comprising adsorption agents located in said fourth container.

7. A water disinfecting and impurity removing device according to claim 6, wherein said adsorption agents include synthetic acrylic fibers.

8. A water disinfecting and impurity removing device according to claim 6, wherein said adsorption agents include aliphatic polyamides.

9. A water disinfecting and impurity removing device according to claim 6, wherein said adsorption agents include polyvinylacetate.

10. A water disinfecting and impurity removing device according to claim 6, further comprising activated charcoal granules attached to said adsorption agents.

11. A water disinfecting and impurity removing device according to claim 1, wherein said nitrate-specific ion exchanger comprises:
    a combination of anion exchangers..

12. A water disinfecting and impurity removing device according to claim 1, wherein said gaseous disinfecting agent producing device is a sodium chloride electrolytic cell.

13. A water disinfecting and impurity removing device according to claim 12, wherein said sodium chloride electrolytic cell comprises a diaphragm.

* * * * *